United States Patent Office 3,130,178
Patented Apr. 21, 1964

3,130,178
PROCESS FOR THE PREPARATION OF MODIFIED MELAMINE RESINS
Joachim Galinke, Dusseldorf-Holthausen, and Manfred Dohr, Dusseldorf, Germany, assignors to Henkel & Cie G.m.b.H., Dusseldorf-Holthausen, Germany, a corporation of Germany
No Drawing. Filed July 21, 1959, Ser. No. 828,458
Claims priority, application Germany July 25, 1958
12 Claims. (Cl. 260—67.6)

This invention relates to a process for the preparation of a modified melamine resins with improved properties.

It is known to use melamine resins as a surface finish or for the production of laminated and molded materials. In many instances the brittleness of the melamine resin and the fact that molded objects produced with the aid of this resin are not true to size are of great disadvantage.

It has been assumed that the cause for the brittleness of the hardened melamine resin is due to the strong three-dimensional cross-linking of only short-chain ether or methylene bridge members. For this reason it has already been attempted to reduce the cross-linking tendency of triazine resins by blocking reactive groups in the molecule of the starting materials, such as by partial etherification of the methylolmelamines. Although an improvement in the plasticity of the resin was achieved in this manner, a deterioration of other properties went along with it. Particularly, the electrical properties of the resin suffered by the modification with compounds containing hydroxyl groups. This disadvantage carries much weight because melamine resins are particularly suitable for various uses because of their favorable electrical properties.

It is an object of this invention to provide a process for producing melamine resins with improved plasticity without detracting from their other properties.

Another object is to produce melamine resins which have reduced "post molding shrinkage" when used in molded objects.

Another object is to produce melamine resins which are readily soluble in water.

These and other objects of my invention will become apparent as the description thereof proceeds.

We have found that the process according to the present invention has now made it possible to achieve the foregoing objects and to produce melamine resins with improved plasticity, which is evidenced by a higher resistance and bending fatigue resistance, without detrimental change in the other properties. The novel resins can therefore be used for all kinds of different purposes. For example, they also have excellent electrical properties. In addition, it has surprisingly been found that molded objects which have been produced from the novel resins are marked by considerably reduced post-molding shrinkage over previously known melamine resins. The term "post-molding shrinkage" is generally understood to designate the difference between the dimensions of the molded object 24 hours after molding and its dimensions after 200 hours of treatment at 80–200° C. measured in terms of percent shrinkage. This advantage of the novel resins is of great importance for the production of molded plastic objects with accurate dimensions. Another important advantage of the process according to the invention is that the melamine precondensates produced in accordance therewith are readily soluble in water, and that these solutions have a considerably longer shelf life than solutions of normal melamine resin precondensates.

The novel process is characterized in that melamine and formaldehyde or substances capable of splitting off formaldehyde or also a corresponding water-soluble melamine-formaldehyde precondensate are condensed together with a water-soluble di- or polyamide containing free amino groups. The condensate thus obtained may subsequently be hardened in accordance with well-known methods. The essential characteristic of the process according to the present invention therefore resides in that melamine resins of customary composition are modified with water-soluble di- or polyamides containing free amino groups.

The preparation of the di- or polyamides which are used for the modification, and which are not claimed as such within the scope of the present application, may be accomplished by a variety of processes which are well known. For example, such products are obtained by condensation of a tri- or polyamine with a di- or polycarboxylic acid or its reactive derivatives, the amine being present in excess. The molar ratio of the reaction components in this condensation reaction must be selected such that the reaction product will contain as many free amino or imino groups as are required to make it water-soluble.

The starting materials for this condensation reaction are preferably aliphatic or cycloaliphatic poly- or triamines such as diethylene triamine or triethylene-tetramine while as acid components, which may also contain other functional groups, preferably adipic acid, sebacic acid, phthalic acid, terephthalic acid, trimesic acid, endomethylene-tetrahydrophthalic acid, and the like are used. Suitable reactive derivatives of acids are, for example, the esters, anhydrides or acid chlorides.

The preparation of the amides is advantageously carried out by heating the acids or their esters with an excess of the polyamine while distilling off the water or alcohol formed by the reaction. Most advantageously, the reaction is carried out with at least twice a molar excess of polyamine, preferably with a molar ratio of 1:4 to 1:6. In this manner low molecular amides are first obtained in which all of the carboxyl groups of the di- or polycarboxylic acid are each linked to one molecule of the particular tri- or polyamine. The free polyamine which is still present in many cases in the reaction product may then be separated therefrom by known procedures, for example by distillation or solvent extraction. However, in some instances it is also advantageous to condense a certain amount of free polyamine into the resin. The low molecular weight condensates formed in this manner may be used in the process according to the invention, but they do not in every case possess optimum properties. It is therefore often advantageous in the production of the di- or polyamide to continue the distillation in vacuo at elevated temperatures atfer distilling off the excess amine. In this manner the formation of high molecular weight products is achieved by again partially splitting off the polyamine. The splitting off of the amine can be continued as long as the high-molecular-weight amide obtained thereby is still water-soluble. For example, in the case of a polyamide produced from sebacic acid and triethylene tetramine this may be done until the molar ratio of acid to polyamine is about 1:1.25.

The reaction between the tri- or polyamine and the di- or polycarboxylic acid may, if desired, be accelerated with the aid of amidation catalysts, such as sodium, sodium alcoholate, sodium hydroxide and other alkalies unless the addition of ion-forming materials should be avoided as much as possible in view of the subsequent use of the resin.

The amides used for the process according to the invention may also be prepared in accordance with other methods, for example by reaction of tri- or polyamines with lactam, such as caprolactam.

Furthermore, it is possible to prepare the di- or polyamides by reacting an amide which does not contain free amino groups with a tri- or polyamine until the product is water-soluble.

The reaction of the amines with di- or polycarboxylic acids or their derivaitves, such as their esters or anhydrides offers particularly wide possibilities for variation and is at the same time particularly simple to perform. This method, therefore, represents the preferred manner of preparing the carboxylic acid amides used in the present process.

The properties of the modified melamine resins produced in accordance with this novel process may be still further improved in various respects if, in accordance with a special embodiment of the present process, condensation products of these amides with urea are used for condensation reaction with melamine and formaldehyde or formaldehyde-precondensates in place of the water-soluble polyamines containing free amino groups.

For the preparation of these condensation products a di- or polyamide containing free amino groups, which has been obtained in accordance with one of the processes described above is reacted with urea at a temperature between about 80 and 200° C., preferably between 100 and 160°. In this reaction the amount of urea present in the reaction mixture may be equivalent to the number of free amino groups present in the polyamide. However, the urea may also be provided in excess or in an amount which is less than the stoichiometric amount. If less than the stoichiometric amount is used, the reaction product will contain free amino groups in addition to ureido groups which is of advantage for various fields of use. If an excess of urea is provided, the unreacted urea will remain dissolved in the reaction product and will be condensed into the resin upon further reaction with melamine and formaldehyde.

The reaction between the di- or polyamide containing amino groups and the urea is accompanied by splitting off of ammonia. This release of ammonia generally begins at a temperature of about 100° C. Beginning at higher temperatures of about 150° C. the release of ammonia is sometimes turbulent. It is, therefore, advantageous to work at a temperature between 100 and 150° C., at least at the beginning of the reaction. The degree of reaction can be determined in very simple fashion by measuring the amount of ammonia given off.

The condensation products containing ureido groups which are obtained in this manner are light yellow, solid masses which, as a rule, have softening points between 60 and 100° C. They are hygroscopic and are advantageously used for the subsequent reaction with melamine and formaldehyde or melamine-formaldehyde precondensates in the form of an aqueous solution.

The di- or polyamides described above may also be used together with the condensates containing ureido groups for the production of the modified melamine resins according to the invention.

For the production of the modified melamine resins according to the invention the amides described above are generally used in amounts from 4 to 40% by weight (based on the melamine), and preferably in an amount between 10 and 20% by weight. If amides which are condensed with urea are used, the amount may be somewhat larger and may range up to 50% by weight, but is preferably between 10 and 25% by weight. The amide or the condensation product formed from the amide with urea may be added at the beginning to the starting material consisting of melamine and formaldehyde. Since the amides or the reaction products formed by the amides with urea are soluble in cold water, this admixture may be accomplished without difficulty. Because of its simplicity this method of operation represents the preferred embodiment. However, it is also possible to subject the di- or polyamide or the condensation product formed by the amide with urea to a reaction with a melamine-formaldehyde precondensate, for example by dissolving a powdery, dry, unmodified melamine resin in water and subsequently reacting this solution with the amide. Another possibility is to subject the amide or the condensation product formed by the amide with urea to a reaction with formaldehyde and subsequently add the melamine and subject it to a condensation reaction with the previous condensation reaction product.

The molar ratio of melamine to formaldehyde in the resins according to the invention should be at least 1:2, and preferably between 1:3 and 1:6. The required content of formaldehyde depends not only upon the amount of melamine but also upon the type and amount of the di- or polyamide or the reaction product formed by the amide with urea. In place of the formaldehyde, compounds which split off formaldehyde may also be used.

The condensation is preferably carried out at a pH value between 7.5 and 9, preferably at about 8.0, and at a temperature between 50 and 100° C., preferably between 75 and 85° C. It is advantageous to maintain the pH value constant during the condensation reaction. The end point of the condensation, which may be selected to conform to the various ultimate uses of the resin, may readily be determined by the well-known dilution test with water. After the condensation the precondensate may be subjected to further treatment in accordance with customary methods. For example, it may be transformed by spray-drying or by drying on a roller mill into a storage-stable powder which ma be redissolved in water prior to use. The aqueous solution of the precondensate may also be used directly for various purposes, and the shelf life of the solution may be further prolonged by the addition of customary condensation retarders such as borax and urotropine.

The melamine resins produced accordinng to the process of the invention may be further modified with further additives, such as extenders or modifying agents. The resin may be hardened in known fashion by heating, if desired in the presence of hardening catalysts, such as those which are customarily used for melamine resins.

The following examples are given for the purpose of illustration and to enable persons skilled in the art to better understand and practice our invention and are not intended to be limitative.

*Example I*

404 gm. adipic acid diethyl ester were admixed with 1236 gm. diethylene-triamine and the mixture was heated in an atmosphere of nitrogen to 140 to 160° C., accompanied by stirring. Beginning at a temperature of about 130° C. alcohol was split off, which was distilled off through a small distillation column. After about 2½ hours, more than 95% of the theoretical amount of alcohol had distilled over. The reaction mixture was cooled and the excess diethylene-triamine was distilled off in a vacuum of 0.5 to 1 mm. After removing the unreacted amine, the distillation, which proceeded distinctly slower than before, was continued until a total of 906 gm. diethylene-triamine had distilled over. Accordingly, the molar ratio of acid to amine in the reaction product was 1:1.6 (amide No. 1).

The run was repeated in the same manner, with the exception that only the unreacted amine was distilled off, that is a total of 824 gm. The molar ratio of acid to amine in this reaction product was 1:2 (amide No. 2).

These amides had a syrupy consistency and were readily soluble even in cold water.

*Example II*

516 gm. sebacic acid diethyl ester were reacted with 1168 gm. triethylene-tetramine in the same manner as described in Example I. Subsequently, 672 gm. excess triethylene-tetramine were distilled off in vacuo. An amide was obtained in this manner in which the molar ratio of acid to amide was 1:1.7. This product was a tenacious mass which solidified after cooling (amide No. 3).

*Example III*

222 gm. phthalic acid diethylester were reacted with 618 gm. diethylene-triamine in the same manner as described in Example I, except that the reaction temperature was 170 to 180° C. Subsequently, 412 gm. excess diethylene-triamine were distilled off. The reaction product obtained in this manner had a molar ratio of acid to amine of 1:2 (amide No. 4).

*Example IV*

378 gm. melamine and 900 cc. of a 30% aqueous formaldehyde solution, which had been adjusted to a pH value of 7.5 with a few drops of a 50% aqueous solution of amide No. 2 prepared in accordance with Example I, were admixed with 75.6 gm. of amide No. 2. The pH of the mixture was adjusted to 8.0 with the aid of formic acid. Subsequently, the resulting mixture was heated to a temperature of 80° C. within 15 to 20 minutes, accompanied by stirring. A clear solution was formed which was condensed at 80° C. until it reached a dilution number of 1:2.0, while constantly controlling the pH (8.0) with the aid of a glass calomel electrode. The resin solution thus obtained was, in contrast to similar solutions of unmodified resins, stable for several weeks.

The resin solution was transformed into a dry powder by spray-drying in a Krause tower. 450 gm. of this powder were compounded with 550 gm. saw dust and 10 gm. O.P.-wax on a roller mill the rolls of which were heated to 65 to 70° C. and 130 to 140° C., respectively. The mass thus obtained was ground and was then molded into test objects at 160° C. and 60 tons pressure. These test objects were then compared with similar test objects made from an unmodified resin which was produced in otherwise similar manner. The following table shows the comparative values.

| | Resin A (unmodified) | Resin B (modified) |
|---|---|---|
| Bonding resistance according to DIN 53 452_____kg./cm.$^2$__ | 740.0 | 810.0 |
| Impact strength according to DIN 53 453_____kg. cm./cm.$^2$__ | 4.2 | 5.9 |
| Impact strength by slit test according to DIN 53 453_____kg. cm./cm.$^2$__ | 1.6 | 1.7 |
| Shrinkage according to DIN 53 464___percent__ | 0.6 | 0.55 |
| Post-molding shrinkage according to DIN 53 464 at 110° C._____percent__ | 1.07 | 0.68 |
| Surface resistance according to DIN 53 452: | | |
| Above_____ohms__ | 9×10$^9$ | 1×10$^{11}$ |
| Below_____do__ | 9×10$^{10}$ | 8×10$^{11}$ |
| Nekal value according to DIN 53 480 (Surface leakage current resistance)_____drops__ | >101 | >101 |

In addition, the suitability of the resin for the production of laminated materials was examined. For this purpose 500 gm. of the dry resin powder described above were stirred into a mixture consisting of 450 gm. water and 50 gm. denatured alcohol at 30° C. The resin solution thus obtained was then applied to both sides of a high-absorption substitute cotton-paper (80 gm./m.$^2$). The resin coating amounted to 120% of the weight of the paper (calculated on the basis of dry resin). After drying, the impregnated sheets were pressed into a laminated material at 130° C. and under a pressure of 80 kg./cm.$^2$. The laminated plate thus obtained was cut up by sawing into test samples having a dimension of 10 x 15 x 100 mm.

The following table shows the tests results of these laminated objects.

| | |
|---|---|
| Tensile strength longitudinal | 18.25 kg./mm.$^2$. |
| Resistance to compression, longitudinal | 20.40 kg./mm.$^2$. |
| Bending strength, longitudinal | 16.70 kg./mm.$^2$. |
| Impact strength, longitudinal | 29.10 cm. kg./cm.$^2$. |
| Splitting load, longitudinal | 198.5 kg. |
| Water absorption, 4 days, 20° C. | 0.68%. |
| Shape retention according to Martens | 238/245° C. |
| Surface resistance | 2.0–2.1·10$^{12}$ ohms. |
| Surface leakage current resistance | Step T5. |

*Example V*

In the same manner as in Example IV, mixed condensates of the melamine and formaldehyde and 20% by weight (based on melamine) of amide No. 1 (Example 1) were produced. The high molecular weight of the amide effected a further reduction in the post-molding shrinkage. A further advantage was the reduced water-absorption of the test objects which was determined with DIN 53 472.

*Example VI*

In the same manner as described in Example IV a modified melamine resin was produced by adding 10% by weight (based on melamine) of amide No. 3 (Example II). This resin was also characterized by increased mechanical properties, reduced post-molding shrinkage and reduced water-absorption.

*Example VII*

In the same manner as in Example IV, a modified melamine resin was produced by adding 20% of amide No. 4 (Example III). In addition to other advantageous properties, this resin exhibited a particularly beautiful surface shine after molding.

*Example VIII*

A mixture consisting of 146 gm. adipic acid and 412 gm. diethylene-triamine was heated in an atmosphere of nitrogen, accompanied by stirring. At a temperature of 160° C. water began to be split off which was distilled off through a small distillation column heated with steam. The temperature was increased to 180° C. in the course of one hour. Thereafter, this temperature was maintained from 1 to 2 hours until 35 cc. water had distilled over. The reaction mixture was then cooled to about 65° C. and 230 gm. diethylene-triamine were distilled off in vacuo (2 to 3 mm. Hg). The residue was a faintly yellow, paste-like substance. The molar ratio of acid to polyamine in the reaction product was 1:1.77. The product was water-soluble.

630 gm. melamine, 1430 cc. of an aqueous formaldehyde solution (31.5 gm. formaldehyde per 100 cc. of solution) and 63 gm. of the amide described above were admixed with each other. The pH of the mixture was adjusted to 8.0 with formic acid. Thereafter, the mixture was heated to 80° C., accompanied by stirring, while the pH was maintained at 8.0 with the aid of dilute sodium hydroxide. The reaction solution was then condensed at this temperature to a dilution ratio of 1:1.5 (measured at 20° C.). Subsequently, the solution was cooled to room temperature.

Paper sheets were impregnated with this resin solution, dried and pressed into laminated objects. Testing of these laminated objects showed improved bending-resistance values and improved impact-resistance values in comparison to laminated objects produced from unmodified melamine resins.

Example IX

A mixture of 202 gm. sebacic acid and 655 gm. dipropylene-triamine was heated at 165 to 170° C. in an atmosphere of nitrogen, accompanied by stirring. When the temperature reached about 120 to 130° C. a clear solution was formed. At about 165° C. water began to be split off. The reaction temperature was then increased to 190° C. in the course of 2 hours until a total of 34.5 gm. water had distilled over. Thereafter, the reaction mixture was cooled and 394.5 gm. dipropylene-triamine were distilled off in vacuo (2 to 3 mm. Hg). The first fraction of this distillate also contained a small amount of residual water formed by the reaction. The almost colorless residue solidified upon cooling into a wax-like mass which had a softening point of 50 to 60° C. and was soluble in water. The molar ratio of acid to polyamine in the reaction product was 1:2.

630 gm. melamine, 1430 cc. of an aqueous solution of formaldehyde (31.5 gm. formaldehyde per 100 cc. solution) and 63 gm. of the amide described above were admixed with each other. The pH of the mixture was adjusted to 8.0 with formic acid. Thereafter the mixture was heated to 90° C., accompanied by stirring, while the pH was maintained at 8.0 with the aid of dilute sodium hydroxide. The reaction solution was then condensed at this temperature to a dilution ratio of 1:2.0. Thereafter, the reaction solution was cooled to room temperature.

Laminated objects produced with the aid of this resin solution exhibited a particularly small water-absorption capability in addition to improved mechanical properties.

Example X 148 gm. phthalic acid anhydride were added within a period of 10 minutes to 730 gm. triethylene-tetramine which had been heated to 120 to 130° C. accompanied by stirring. The anhydride immediately dissolved while the temperature rose to about 140° C. After all of the anhydride had been added, the mixture was first heated to 165° C. After water had begun to split off, the temperature was gradually increased to 180° C. over a period of two hours. During this time the water was distilled off through a small distillation column heated with steam. After 17.1 gm. water had distilled over, the excess triethylene-tetramine (340 gm.) was distilled off in vacuo. The molar ratio of acid to amine in the reaction product was 1:2. The product was water-soluble.

630 gm. melamine, 1430 cc. of an aqueous formaldehyde solution (31.5 gm. formaldehyde per 100 cc. solution) and 31.5 gm. of the amide described above were admixed with each other. The pH of the mixture was adjusted to 8.0 with formic acid. Thereafter, the mixture was heated to 100° C. accompanied by stirring, while the pH was maintained at 8.0 with the aid of dilute sodium hydroxide. The reaction solution was then condensed at 100° C. to a dilution ratio of 1:2.2 (measured at 20° C.). This value was reached after about 20 minutes of heating.

Although only a relatively small amount of polyamide was added to the resin in the present instance, a distinct improvement in the mechanical properties of laminated objects produced with the aid of this resin could nevertheless be noted.

Example XI 202 gm. adipic acid diethyl ester and 618 gm. diethylene-triamine were admixed with each other and the mixture was heated to a temperature of 140 to 160° C. in an atmosphere of nitrogen, accompanied by stirring. Beginning at a temperature of about 130° C., alcohol was split off, which was distilled off through a small distillation column. After about 3 hours of heating more than 95% of the theoretical amount of alcohol had distilled over. The reaction mixture was cooled and the excess diethylene-triamine was distilled off in a vacuum of 0.5 to 1 mm. Hg. After removing the unreacted amine the distillation was continued until a total of 448 gm. diethylene-triamine had distilled over. The molar ratio of acid to amine in the amide thus obtained was accordingly 1:1.65. The polyamide containing free amino groups which was obtained in this manner was cooled to about 70 to 80° C. and was then admixed with 120 gm. urea, accompanied by stirring. Thereafter, the mixture was heated slowly to 120° C., accompanied by stirring. The urea completely dissolved in the polyamide. At about 100° C. ammonia began to be evolved, the evolution being at first very vigorous, and after no more ammonia formed, the temperature of the reaction was increased to 150 to 160° C. Heating was continued until a total of 34 gm. of ammonia had been given off. The ammonia was collected in washing bottles containing dilute sulfuric acid and its quantity was determined by titration. The reaction product was cooled to about 80° C. at which temperature it did not yet solidify. It was stirred into water to form a 50% aqueous solution. The solution was then cooled to room temperature. The pH of the solution thus obtained was between 9.5 and 10.0.

A sample of the solidified reaction mass had a light yellow color and was highly hygroscopic. The softening point (according to D'Alelio) was 70 to 80° C.

Example XII

The run described in Example XI was repeated except that, in the production of the polyamide containing free amino groups, only the unreacted amine was distilled off, namely a total of 412 gm. The molar ratio of acid to amine in the resulting amide was 1:2. The amide was also reacted with 120 gm. urea, the procedure being the same as in the preceding example.

The reaction product thus obtained was also stirred into water to form a 50% aqueous solution. A sample of the solid reaction product exhibited a softening point of 70 to 80° C. It was highly hygroscopic.

Example XIII 630 gm. melamine, 39.7 gm. para-formaldehyde and 1302 cc. of an aqueous formaldehyde solution (31.5 gm. formaldehyde per 100 cc. solution) which had been adjusted to a pH of 7.5 with sodium hydroxide were admixed with 252 gm. with a 50% aqueous solution with the condensation product containing ureido groups produced in accordance with Example XI. The resultant mixture was heated to 80° C., the pH of the solution being adjusted to 8.0 with dilute formic acid. Thereafter, the solution was condensed at a temperature of 80° C. to a precipitation value of 1:1.6 while the pH was constantly checked with a glass-calomel electrode and maintained at 8.0.

The resin solution thus obtained was cooled to room temperature. It had a pH of 8.90 (20° C.), a precipitation value of 1:1.5 and a hardening time of 12 to 14 minutes at 120° C. The solution was stable at room temperature over a period of several days. A portion of this solution was transformed into a powder by spray-drying. The resin powder, which had a good shelf life, had an adhesive point of 90 to 95° C., a melting point of 105 to 110° C. and a hardening time of 10 to 12 minutes at 120° C. The powder could be smoothly stirred into water. A 50% solution had a precipitation of 1:1.5 and a pH of 8.9.

450 gm. of the resin powder produced in the manner described above was compounded with 550 gm. saw dust and 10 gm. zinc stearate on a mixing roller the rolls of which were heated to 65° to 75° C. and 130 to 140° C., respectively. The mass thus obtained was ground and molded into test objects at 160° C. and 60 tons pressure. These test objects were compared with similar test objects produced from an unmodified but otherwise identically produced melamine resin. The following table shows the test values. The post-molding shrinkage of the modified resin was considerably reduced in comparison to the unmodified resin.

| | Unmodified Resins | Modified Resins |
|---|---|---|
| Bending strength_____kg./cm.² | 740 | 850 |
| Impact strength_____kg. cm./cm.² | 4.2 | 7.0 |
| Impact strength by slit test_____kg. cm./cm.² | 1.6 | 1.9 |
| Shrinkage_____percent | 0.6 | 0.64 |
| Martens number (heat resistance)_____° C | 143 | 125 |
| Nekal value (Surface leakage current resistance)_____drops | >101 | >101 |

Another portion of the resin solution was used for impregnation of sheets of paper which were pressed into laminated objects after drying. Comparative tests with unmodified melamine resin as well as with the resin obtained in accordance with Example 4 showed an improvement in mechanical properties. The increase in impact-strength was about 50% in comparison to the resin obtained according to Example 4. The increase in the bending strength was also considerable.

*Example XIV*

1430 cc. of an aqueous formaldehyde solution (31.5 gm. formaldehyde per 100 cc. solution) were adjusted to a pH of 7.5 with dilute sodium hydroxide, 630 gm. melamine were added and the mixture was further admixed with 252 gm. of a 50% aqueous solution of the condensation product containing ureido groups produced in accordance with Example XII. The reaction mixture was heated to 80° C., adjusted to a pH of 8.0 and condensed to a precipitation value of 1:4 at 80° C. Thereafter, the solution was cooled to room temperature. The cooled solution had a pH of 9.0 (20° C.) and a precipitation value of 1:3.0. The hardening time was 10 to 15 minutes at 120° C.

This solution was used for the production of laminated molded materials. In comparison to a laminated molded material produced under otherwise identical conditions but with the aid of an unmodified melamine resin, this resin had 100% improved impact strength values.

*Example XV*

A polyamide containing free amino groups, prepared according to Example VIII from 146 gm. adipic acid and diethylene-triamine, was admixed with 60 gm. urea at a temperature of about 70 to 80° C., accompanied by stirring. Thereafter, the reaction mixture was heated to about 100° C. The ammonia gas formed thereby was removed with the aid of a stream of nitrogen. In the course of 1½ hours the temperature was gradually increased to 135° C. until a total of 17 gm. ammonia had been given off. The ammonia was collected in a washing bottle containing dilute sulfuric acid and the quantity was determined by titration.

The colorless reaction product obtained in this manner contained free amino groups in addition to ureido groups. It exhibited a softening point of 40 to 50° C. and was highly hygroscopic.

189 gm. of this polyamide, 630 gm. melamine and 1430 cc. of an aqueous formaldehyde solution (31.5 gm. formaldehyde per 100 cc. solution) were admixed and the mixture was heated to 80° C., accompanied by stirring. After this temperature was reached the reaction solution was adjusted to a pH of 8.0 and this value was maintained constant during the entire reaction period. The condensation was continued at 80° C. until a precipitation value of 1:1.6 was reached. Thereafter, the solution was cooled to room temperature. It had a pH of 8.2, a precipitation value of 1:1.5 and a hardening period of 10 to 12 minutes at 120° C. The solution was stable at room temperature over several days without any increase in its viscosity.

A portion of the resin solution thus obtained was used for impregnating sheets of paper. These impregnated sheets were dried and then molded into laminated material. A test of the impact-strength and bending-resistance showed that in the present case considerable improvements were also achieved over similar test objects produced with the aid of unmodified melamine resin.

*Example XVI*

A polyamide containing free amino groups was produced in accordance with Example IX from 202 gm. sebacic acid and dipropylene-triamine. 300 gm. urea were admixed with this product at about 90° C., accompanied by stirring. The resulting mixture was first heated to 100° C. and then gradually over a period of three hours to 170° C. A total of 68 gm. ammonia gas were driven off.

The residue solidified upon cooling into a solid mass which was water-soluble and had a softening point of 60 to 70° C. The product contained excess urea. 94.5 gm. of this product, 630 gm. melamine and 1430 cc. of an aqueous formaldehyde solution (31.5 gm. formaldehyde per 100 cc. solution) were heated to 80° C., accompanied by stirring. After this temperature was reached the reaction mixture was adjusted to a pH of 8.0 and this value was maintained constant during the entire reaction. The condensation reaction was continued at 80° C. until the precipitation value was 1:1.6. Subsequently, the solution was cooled to room temperature.

The resin solution obtained in this manner was used for the production of laminated materials. Despite the content of free urea, test samples of this material exhibited improved mechanical properties in comparison to test samples of similar laminated material produced with the aid of unmodified melamine resin.

*Example XVII*

In the same manner as in Example XV, a modified melamine resin was produced by adding 63 gm. of a polyamide containing free amino groups, produced according to Example VIII, to 63 gm. of the reaction product of this polyamide with urea, obtained according to Example XV. The condensation was carried out at 80° C. at a constant pH of 8.0 until the precipitation value of 1:1.6 was reached. The properties of the modified melamine resin thus obtained were between the properties of the melamine resin according to Example XIII and the melamine resin obtained according to Example XV as expected.

While we have set forth specific embodiments and preferred modes of practice of our invention, it will be understood that the invention is not limited to these embodiments and that various changes and modifications may be made without departing from the spirit of the disclosure or the scope of the appended claims.

We claim:

1. A process for the production of modified melamine resins, comprising condensing the compounds (1) melamine and (2) formaldehyde, said compounds being in a molar ratio of 1:2 to 1:6, with (3) from about 4 to up to 50% based on the melamine of a cold water soluble amide compound selected from the group consisting of a polyamide having unsubstituted amino groups, condensation products of said polyamide with urea, said products containing ureido groups, and mixtures of said amide compounds, wherein said amide being prepared by reacting (a) polycarboxylic acids and esters thereof, wherein said acid has at least two carboxyl groups, with (b) aliphatic polyamines having at least three amine groups, the condensation reaction being carried out in a solvent medium with water as the solvent at a pH of about 7.5 to 9 and at a temperature of betweena bout 50 and 100° C.

2. The process of claim 1 wherein the water soluble amide having unsubstituted amino groups is used in an amount of from about 4 to about 40% by weight based on the melamine.

3. The process of claim 1 wherein the condensation product formed by urea and the amide is added in an amount from about 4 to about 50% based on the melamine.

4. The process of claim 3 wherein the condensation product is added in an amount of between about 10 to 25%.

5. The process of claim 1 wherein free tri- and polyamines are condensed into the resin.

6. The process of claim 1 wherein the condensation product formed by the amide and urea has unsubstituted amino groups in addition to ureido groups.

7. The process of claim 1 wherein the condensation product formed by the amide and urea contains excess urea.

8. A process for the production of modified melamine resins, comprising condensing the compounds (1) melamine and (2) formaldehyde, said compounds being in a molar ratio of 1:2 to 1:6, with (3) from about 4 to up to 50% based on the melamine of a cold water soluble amide compound selected from the group consisting of a polyamide having unsubstituted amino groups, condensation products of said polyamide with urea, said products containing ureido groups, and mixtures of said amide compounds, wherein said amide being prepared by reacting (a) polycarboxylic acids and esters thereof, wherein said acid has at least two carboxyl groups, with (b) aliphatic polyamines having at least three amine groups, the condensation reaction being carried out in an aqueous medium at a pH of about 7.5 to 9 and at a temperature of between about 50 and 100° C., and thereafter hardening said melamine resin.

9. A process for the production of modified melamine resins, comprising condensing the compounds (1) melamine and (2) formaldehyde, said compounds being in a molar ratio of 1:2 to 1:6, with (3) from about 4 to up to 50% based on the melamine of a cold water soluble amide compound selected from the group consisting of a polyamide having unsubstituted amino groups, condensation products of said polyamide with urea, said products containing ureido groups, and mixtures of said amide compounds, wherein said amide being prepared by reacting (a) polycarboxylic acids and esters thereof, wherein said acid has at least two carboxyl groups, with (b) aliphatic polyamines having at least three amine groups, the reaction being carried out at a pH of about 8 and at a temperature between about 75 to 85° C.

10. A process for the production of modified melamine resins, comprising condensing the compounds (1) melamine and (2) formaldehyde, said compounds being in a molar ratio of 1:2 to 1:6, with (3) from about 4 to up to 50% based on the melamine of a cold water soluble amide compound selected from the group consisting of a polyamide having unsubstituted amino groups, condensation products of said polyamide with urea, said products containing ureido groups, and mixtures of said amide compounds, wherein said amide being prepared by reacting (a) polycarboxylic acids and esters thereof, wherein said acid has at least two carboxyl groups, with (b) aliphatic polyamines having at least three amine groups, the condensation reaction being carried out in an aqueous medium at a pH of about 7.5 to 9 and at a temperature of between about 50 and 100° C., whereby a water soluble resin is formed, and thereafter transforming said resin into a dry powder.

11. A process of claim 10 wherein the resin is spray dried.

12. A process for the production of modified melamine resins, comprising condensing the compounds (1) melamine and (2) formaldehyde, said compounds being in a molar ratio of 1:2 to 1:6, with (3) from about 4 to up to 50% based on the melamine of a cold water soluble amide compound selected from the group consisting of a polyamide having unsubstituted amino groups, condensation products of said polyamide with urea, said products containing ureido groups, and mixtures of said amide compounds, wherein said amide being prepared by reacting (a) polycarboxylic acids and esters thereof, wherein said acid has at least two carboxyl groups, with (b) aliphatic polyamines having at least three amine groups, the condensation reaction being carried out in an aqueous medium at a pH of about 7.5 to 9 and at a temperature of between about 50 and 100° C.

References Cited in the file of this patent

UNITED STATES PATENTS

| 2,317,181 | D'Alelio | Apr. 20, 1943 |
| 2,584,177 | Wohnsiedler et al. | Feb. 5, 1952 |
| 2,589,567 | Nickerson | Mar. 18, 1952 |

FOREIGN PATENTS

| 676,011 | Great Britain | July 23, 1952 |
| 506,393 | Great Britain | May 25, 1939 |